Feb. 24, 1931.   G. TE GROEN ET AL   1,794,013
SPRINKLER
Filed Oct. 16, 1929
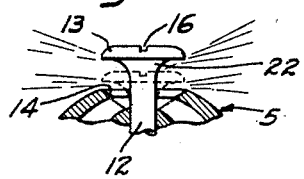
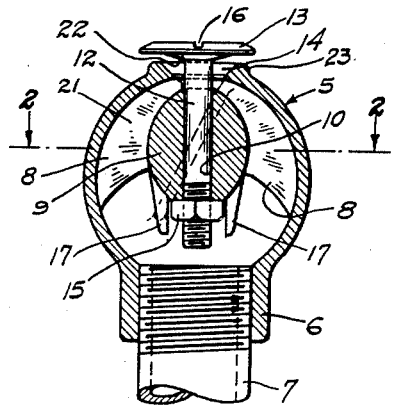
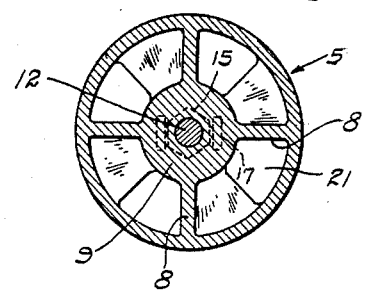
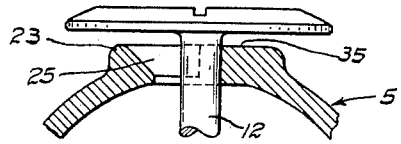
INVENTORS.
Gerard te Groen and
Peter W. te Groen
BY
Robt. W. Pearson
ATTORNEY.

Patented Feb. 24, 1931

1,794,013

UNITED STATES PATENT OFFICE

GERARD te GROEN AND PETER W. te GROEN, OF LONG BEACH, CALIFORNIA

SPRINKLER

Application filed October 16, 1929. Serial No. 400,022.

This invention relates to a sprinkler adapted for use either in automatic sprinkler systems or for a sprinkler of the portable type.

An object of the invention is to provide a sprinkler head having a spray regulating attachment which in certain respects is an improvement upon other devices of its class with respect to simplicity of construction, durability and convenience of adjustment for the purpose of regulating the size and shape of the spraying orifice.

A further object of the invention is to provide improved means for preventing the sprinkler from becoming clogged with earth, grass blades or the like.

Other objects and advantages may hereinafter appear.

Referring to the accompanying drawings, which illustrate what is at present deemed to be a preferred embodiment of the invention, Fig. 1 is a vertical mid-section of the device.

Fig. 2 is a transverse section on line 2—2 of Fig. 1.

Fig. 3 is a mid-sectional view of a modification of the upper portion of the casing of the sprinkler head, part of the valve being shown in side elevation.

Fig. 4 is a modified mid-sectional view of the device.

Referring in detail to the drawings, the casing 5 of the sprinkler head is of a hollow spherical character and is provided at its lower end with an internally threaded shank 6 which is screwed on to the tubular supply conduit 7. Said supply conduit 7 may be one of the stand pipes of an automatic sprinkler system, or may be connected with a portable base (not shown) such as is commonly used as a means for connecting a garden hose with a sprinkler head.

Said sprinkler head 5 is provided with internally projecting spiral ribs or webs 8, four of such ribs being shown in the illustrated embodiment of the invention. Said webs 8 are joined at their inner edges to a central body 9, which has a vertical bore 10 extending therethrough. The body, ribs and casing of the sprinkler head are all preferably formed as integral parts of a single casting.

Through the vertical bore 10 extends a valve stem 12 provided at its upper end with a valve head 13 to regulate the size of the spraying orifice 14. The lower portion of valve stem 12 is screw threaded to receive a nut 15, and the upper side of the valve head 13 is provided with a groove or kerf 16 to receive a screw-driver or like tool. In order to prevent the nut 15 from rotating when the valve stem is being adjusted, a downwardly extending lug 17 is provided at each side of the lower portion of the body 9, the inner faces of said lugs being spaced at the right distance apart to permit the nut 15 to be inserted between them, but being placed so close to the nut that they prevent its rotation. The nut 15 should be made to screw upon the threaded portion of stem 12 as tightly as is consistent with convenient rotation of the valve stem by means of a screw-driver or like tool.

On all sides of the body 9 there is located between the ribs 8 an upwardly tapered annular space, said body 9 forming the inner wall of said space and the casing 5 forming the outer wall thereof. This space 21 communicates at its upper end around the valve stem 12 with the nozzle orifice 14. The lower side of the valve head 13 is provided with a downwardly extending broadly conical swell or projection 22 on all sides of the valve stem, said valve stem being located centrally of the spraying orifice 14 and the spraying orifice being tapered from without inwardly, thus providing for the nozzle a discharge passage which is continuously contracted from its intake end to its discharge end. The valve head 13 is formed as a horizontal disc the diameter of which is sufficient to reach slightly beyond the annular boss or shoulder 23 which bounds the spraying orifice.

In Fig. 3 is shown a modification wherein the sprinkler head 5 is provided with a semicircular spraying orifice 25 which is well adapted for use in sprinklers of the automatic system type wherein a row of sprinklers are located at the edge of a lawn and are constructed and arranged to discharge their spray from one side only, the other side being closed at 35.

The annular shoulder 23 which, in both forms of the invention, is provided around the outer edge of the delivery orifice, safeguards said orifice from becoming clogged with dirt when the device is installed near the surface of the ground as part of an automatic sprinkling system.

In the operation of the device the spiral ribs or webs 8 will impart a whirling movement to the stream of liquid issuing from the nozzle, the speed of the stream being uniformly accelerated by the continuously tapering character of the annular discharge passage considered as a whole. In Fig. 1 the valve head is shown adjusted to deliver a relatively large stream which will issue from the discharge orifice at a considerable angle above horizontal, and by screwing down the valve head and stem the stream will be delivered in a more horizontal manner. The size of the stream will not be lessened, however, until the cross-sectional area between the annular shoulder 23 and the lower side of the head of the valve becomes less than the cross-sectional area of the annular space between the valve stem 12 and the inner edge of the spraying orifice 14.

Claims:

1. A sprinkler head comprising a hollow body having internally projecting webs, a central internal body supported by said webs and having a tapered discharged passage therearound, there being a hole through said body, a valve head to control the flow of liquid through said passage, said valve head having a stem extending through said hole, a nut screwing onto said stem, and lugs projecting from said body to prevent said nut from rotating during the adjustment of said valve stem by rotation thereof.

2. A sprinkler head comprising a hollow body having internally projecting webs, a central internal body supported by said webs and having a tapered discharged passage therearound, there being a hole through said body, a valve head to control the flow of liquid through said passage, said valve head having a stem extending through said hole, a nut screwing onto said stem, and means in fixed relation to the sprinkler head to prevent said nut from rotating during the adjustment of said valve stem by rotation thereof.

In testimony whereof we hereunto affix our signatures.

GERARD te GROEN.
PETER W. te GROEN.